Patented July 11, 1944

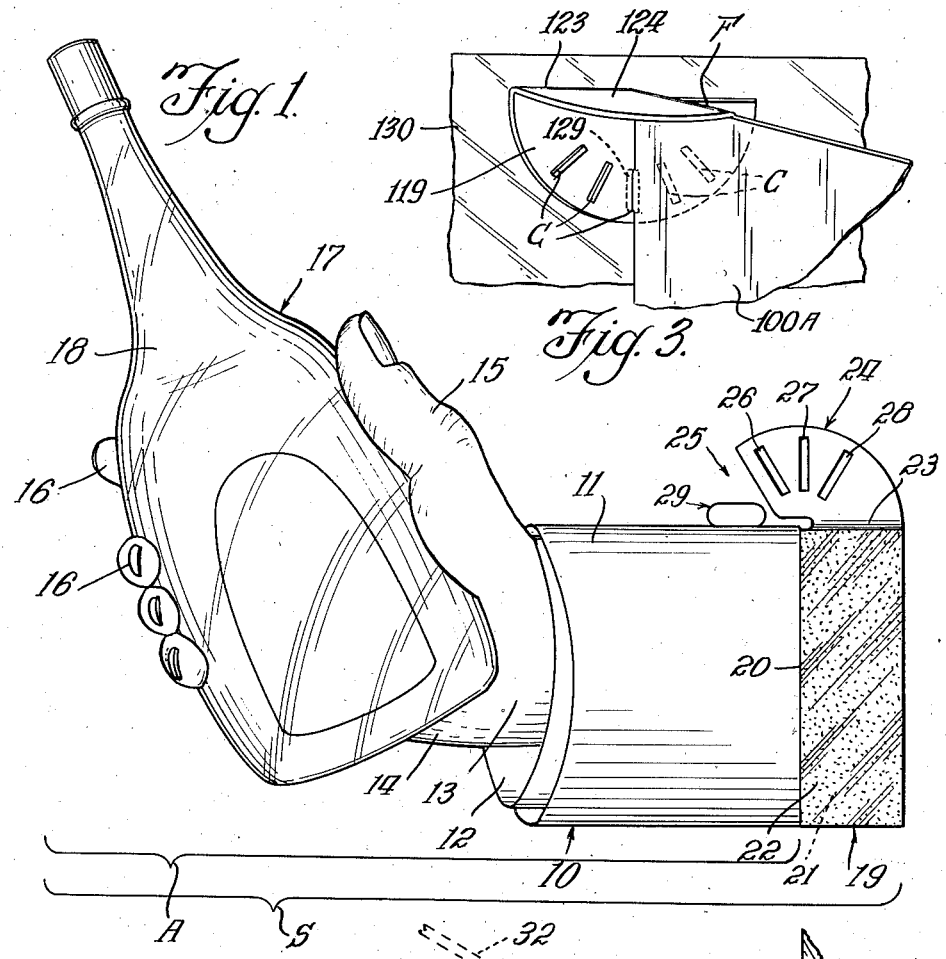
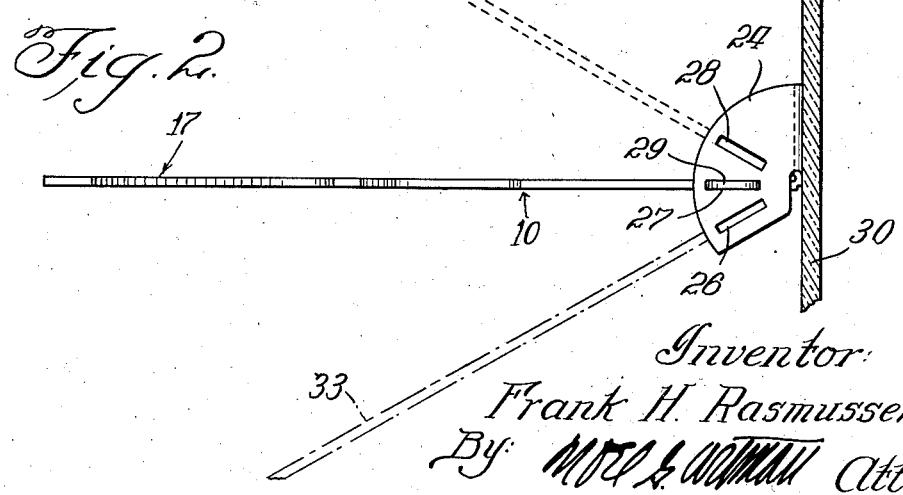

2,353,359

UNITED STATES PATENT OFFICE 2,353,359

ADVERTISING POSTER

Frank H. Rasmussen, Chicago, Ill., assignor to Magill-Weinsheimer Company, Chicago, Ill., a corporation of Illinois Application January 30, 1942, Serial No. 428,860

6 Claims. (Cl. 40—126)

This invention has to do with advertising devices of the poster or placard type and more particularly to such a device in the form of a sheet-like body of which portions are pivotal about fold lines into predetermined assembly.

The general object of this invention is the provision of an advertising device having a base portion attachable to a wall, fixture or the like, an advertising portion pivotally depending from said base portion, and means for maintaining the advertising portion in a predetermined pivotal position.

The invention further contemplates and has for one of its objects an advertising device including hingedly connected portions of sheet material foldable at such connections from respective positions within a common plane to respectively form a base portion for said device, an advertising portion projecting angularly outwardly from the base portion, and a gusset-like portion interconnecting the base and advertising portions to contribute to the maintenance of a predetermined angular relation of the advertising portion with one of the other portions.

Another object is the provision of an advertising device according to the next preceding object wherein the advertising portion is pivotally connected solely with one of the other of said portions and has means thereon insertable within a cut-away section of the other of said other portions to maintain said predetermined angular relation of the advertising portion.

Still a further object is the provision of an advertising device according to any of the above objects, wherein an adhesive layer is upon a face of the base portion to effect a supporting connection therefor with a flat surface upon a foreign object.

These and other desirable objects inherent in and encompassed by the invention will become apparent from the following description together with the annexed drawing, wherein:

Fig. 1 is a plan view of a preferred embodiment of the invention in a knocked-down condition;

Fig. 2 is a view looking downwardly upon the device of Fig. 1, illustrated as installed upon a vertical supporting surface; and Fig. 3 is a fragmentary perspective view of a modified form of the invention.

As is ascertainable from the drawing, the device is made from a single piece of sheet material such as cardboard, and thus comprises a sheet-like body S. Said body is cut or stamped in a shape to form an advertising portion A of which the right-hand part 10 has the outline of and is adapted to have pictorially represented thereon the lower portion of a coat sleeve 11, a shirt cuff 12 projecting slightly from said sleeve, and a wrist 13 of the wearer of the garments of which said sleeve and cuff are a part. Other parts of the advertising portion A are shaped to facilitate the pictorial representation thereon of a human hand 14 joined to the wrist 13 together with a thumb 15 and fingers as 16. The advertising portion A is shaped at 17 to form the outline, in part, of an article of merchandise, and to bear printed matter pictorially illustrating such merchandise. The arrangement of the body portions 10 and 17 are such that the printed matter thereon is enhanced in showing a bottle 18 held within said hand 14.

A base portion 19 of the blank is separated from the advertising portion A by a scored fold line 20 of which one face is coated with a layer of adhesive material 21 protected by a removable film 22 for protecting and preserving such adhesive layer until the device is to be installed.

A second fold line, 23, separates a gusset portion 24 of the sheet-like body, constituting one component of an adjustable retaining means 25, from the upper end of the base portion 19. A plurality of cut-away sections (slots in the present embodiment) 26, 27 and 28 are formed in the gusset portion 24. These cut-away sections are adapted for individual reception of a locking tab 29 constituting the other component of said adjustable retaining means 25, when the device is set up for use.

The device is particularly adapted for use when attached to plain vertical surfaces such as mirrors, windows, smooth walls and woodwork. Installation of the device is a simple matter. This is accomplished by first removing the protective film 22 from the adhesive layer 21, as by inserting a thumbnail or other instrumentality beneath an edge of the film to facilitate grasping such edge preparatory to peeling it from the adhesive layer. This having been done the base section 19 will be bent about the fold line 20 at an angle to the advertising portion A, whereupon the portion 19 will be adhesively secured to any desired position upon the surface as of a mirror of which a fragmentary part is shown at 30 in Fig. 2. The side of the portion 19 opposite to that upon which the adhesive layer 21 obtains may be pressed upon as by the finger tips to force the adhesive layer into firm engagement with the supporting member 30. Next, the slotted gusset flap is bent forwardly and downwardly from the supporting surface 30 to cause one of the slots as 27 to receive the tab 29 for maintaining the advertising portion A in a desired angular relation with respect to the supporting wall or the like as 30, upon which the device is installed. Such angularity may be changed as desired by selecting the aperture as 27 into which the tab 29 is projected. In Fig. 2 the tab 29 is illustrated in the slot 27, causing the display or advertising portion of the device to be disposed perpendicularly to the supporting part 30. It will be seen, however, that by lifting the flap 24 to disengage the slot 27 from the tab 29 and then pivoting the display portion of the device into the dotted-line position 32 that this latter position is thereafter maintainable by folding said flap 24 downwardly for engaging the tab 29 within the slot 28. The third position possible for the display portion of the present device is represented by the dot dash lines 33 and is maintainable by engaging the tab 29 in the slot 26.

While only the three slots 26, 27 and 28 are shown, conceivably any number of slots could be provided without departing from the spirit of this invention. It will also be apparent that the display or advertising portion A of the device might be differently shaped and printed to depict parts entirely different than a sleeve, cuff and hand of a human being and that the merchandise portion 17 might be otherwise shaped and printed for displaying an entirely different article of merchandise, or for supporting an actual merchandise article.

The modification shown fragmentarily in Fig. 3 is also made of a sheet-like body as a sheet of cardboard, and comprises a base portion 119, a gusset portion 124 separated from the portion 119 by a scored fold line 123 and an advertising portion 100A depending from the gusset portion 124 at a scored fold line F. The parts 119, 124 and 100A correspond respectively to the parts 19, 24 and A in the first embodiment. An adhesive layer (not shown) corresponding to the layer 21 upon the base portion 19 is upon the back side of the base portion 119 as viewed in Fig. 3, for securing the device upon the face of a mirror 130 or the like. A plurality of cut-away sections C in the form of slots are provided in the base portion 119 in an arcuate formation spaced radially from the fold line F as an axis. Such radial spacing of the slots C corresponds to the spacing of a tab 129 projecting edgewise from the advertising portion 100A.

It will be observed that the fold line 123 is at a higher elevation than the upper edge portion of the base 119 extending horizontally to the right of said fold line, wherefore when the parts 119, 124 and 100A are disposed within a single plane, the edge of the part 100A carrying the tab 129 will be spaced from said horizontal upper edge portion of the base 119. The stock forming the tab 129 is left upon its edge of the part 100A when the remainder of the material between such edge and the horizontally extending edge of the base portion 119 is removed.

It will be understood that the angular position of the advertising portion 100A about an axis coincident with the fold line F may be selected and maintained by placing said advertising portion in any of the various positions wherein the tab 129 registers with any of the slots C, and thereafter inserting the tab into the slot with which it is registered. In knocking down the device to place the various portions 119, 124 and 100A into a common plane, subsequently to detaching the base portion 119 from the supporting member 130, said base section 119 will simply be displaced upwardly about an axis coincident with the fold line 123 and the portion 100A will likewise be displaced upwardly about the axis coincident with the fold line F.

It is thought that the invention and many of its attendant advantages will be understood from the foregoing description, and it will be apparent that many changes may be made in the form, construction and arrangement of the parts without departing from the spirit and scope of the invention or sacrificing all of its material advantages, the forms herein described being merely preferred embodiments thereof.

I claim:

1. An advertising poster device comprising a sheet-like body having fold lines respectively defining pivotal axes within the plane of said body and substantially intersecting at substantially right angles, said body including a base portion embraced within the interior angle defined by said fold lines, an advertising portion separated from said base portion by one of said fold lines, and having an edge portion in substantial axial alignment with the other of said liines and a securing tab projecting edgewise from said edge portion perpendicularly to said other fold line, while said body is flat, and a holding portion of said sheet-like body separated from the base portion by the other fold line and having a slit-like cut-away means therein directed radially of the intersection point of said fold lines, said advertising portion being pivotal about the axis defined by the one fold line into a predetermined position of angularity with respect to said base portion, and said holding portion being pivotal about the axis defined by said other fold line into co-operative relation with said advertising portion to project the slit-like cut-away means over said tab for maintaining said advertising portion in said position of angularity.

2. An advertising poster device comprising a sheet-like body including a base portion securable to a wall or the like for the support of said device, an advertising portion hingedly associated with said base portion along an edge to permit angular adjustment of said advertising portion with respect to said base portion, and means for maintaining said advertising portion in a selected position of such adjustment, comprising a flap portion of said body hingedly associated with an edge of said base portion that is substantially at right angles to the first named edge thereof, to facilitate the disposal of said flap adjacently to and substantially perpendicularly to said advertising portion while the latter is in any of positions of adjustment, and a plurality of means on said flap respectively registering with said advertising portion in said positions and detachably engageable therewith to maintain it respectively at such positions.

3. The combination set forth in claim 2, wherein there is a tab upon said advertising portion, and wherein said plurality of means on said flap are cut-away sections therein respectively receptive of said tab.

4. In a blank, foldable into an advertising poster device, a base portion having adjacent edges respectively defined by fold lines arranged substantially at right angles to one another, an adhesive layer upon a face of said base portion, an advertising portion separated from the base portion by one of said fold lines and pivotal thereon to project outwardly from the face of the base portion opposite to that bearing the adhesive layer and having an edge portion adjacently to the other of said fold lines, and a locking portion separated from the base portion by said other fold line, said locking portion being pivotal on such fold line to also project outwardly from the face of the base portion opposite to that bearing the adhesive layer toward said advertising portion at said edge, and said locking portion having a cut-away section engageable with said edge portion of the advertising portion when said advertising and locking portions are so projected outwardly from the base portion, to retain the advertising portion predeterminedly pivoted with respect to the base portion.

5. An advertising poster device comprising a sheet-like body comprising an advertising portion and base and gusset portions of which latter portions one is interposed between said advertising portion and the other, said body having a pair of fold lines arranged substantially at right angles to one another and disposed respectively between the interposed portion and the other said portions, said line between said interposed and advertising portions facilitating the pivoting thereon of the advertising portion into a predetermined angular relation with respect to the interposed portion, said line between the interposed portion and the other of said portions facilitating the pivoting thereon of said other portion into a position perpendicularly to both the interposed and advertising portions and toward an edge of the advertising portion while the latter occupies said predetermined angular relation, and cut-away means on said other portion projectable into interlocked relation with a section of said edge of the advertising portion pursuant to such movement toward said edge while said advertising portion is in the predetermined angular relation, to maintain the advertising portion in such relation.

6. In a blank, foldable into an advertising poster device, a gusset portion having adjacent edges respectively defined by fold lines arranged substantially at right angles to one another, a base portion separated from said gusset portion by one of said fold lines and pivotal upon said fold line to project outwardly from a face of said gusset portion, an adhesive layer upon one face of said base portion for installing the device upon a supporting surface, an advertising portion separated from the gusset portion by the other of said fold lines and pivotal thereon to also project outwardly from the aforesaid face of said gusset portion and having an edge portion thus disposed adjacently to the face of said base portion opposite to the face thereof carrying the said adhesive layer, a plurality of receiving means upon said base portion spaced circumferentially about the intersection point of said fold lines and each being receivable of said edge portion, said advertising portion also being pivoted about such other fold line to occupy selected angular relations while disposing said edge portion in registry with respective of said edge receiving means, and said gusset and advertising portions being bodily pivotal about the one fold line to engage or disengage said edge portion with said receiving means, whereby the angle of the advertising portion may be selected or changed after installation of the device.

FRANK H. RASMUSSEN.